Dec. 29, 1964  S. F. CHAPPELL  3,163,335
TILTABLE MEASURING DISPENSER
Filed April 27, 1962  2 Sheets-Sheet 1

INVENTOR.
STORY F. CHAPPELL
BY
Curtis, Morris & Safford
ATTORNEYS

Dec. 29, 1964  S. F. CHAPPELL  3,163,335
TILTABLE MEASURING DISPENSER
Filed April 27, 1962  2 Sheets-Sheet 2

INVENTOR.
STORY F. CHAPPELL
BY
Curtis, Morris & Safford
ATTORNEYS

United States Patent Office 3,163,335
Patented Dec. 29, 1964

3,163,335
TILTABLE MEASURING DISPENSER
Story F. Chappell, 9 Knoll St., Riverside, Conn.
Filed Apr. 27, 1962, Ser. No. 190,602
7 Claims. (Cl. 222—455)

This invention relates to dispensers and in particular to dispensers which are suitable for use with a container of thick or viscous liquid, such as a detergent and soap.

Liquid detergents and soaps are now packaged in containers which may readily be used with dispensers which provide a consistent measured dose (within tolerances acceptable to the trade). However, as far as it is known, no adequate dispenser without a number of moving parts is available which will meet the needs of these thick heavy liquids. The only known automatic dispensing devices for these containers are those which are primarily intended for use with thin watery type liquids such as liquors and hair tonic.

In order to use most liquid detergents properly and economically, it is necessary that only a definite and measured amount of detergent be used in making each quantity of solution. Heretofore, the standard means of measuring the correct amount of liquid detergent has been to fill a measuring cap. Such a measuring operation is cumbersome and messy as well as being a nuisance to the user.

Some dispensers designed for use with thin and watery types of liquids have delicate moving parts which are quickly clogged by thick, heavy, viscous liquids such as detergents. Still others have moving parts that remain exposed to the air between uses. Such dispensers with easily clogged or air-exposed moving parts become tightly sealed, and the moving parts "frozen," by a dried or caked film of detergent when the dispenser is left unused for any extended period of time, which is often the case.

Dispensers designed for use primarily with thin and watery liquids are also fairly intricate and expensive to manufacture and are not usually designed for insertion into containers as part of an automatic factory loading operation.

Accordingly, it is an object of the present invention to provide an automatic, self-operating dispenser particularly adapted for use with thick viscous liquids such as detergents, and soaps. It is another object to provide a dispenser which is of simple construction and inexpensive to manufacture. It is a further object to provide a dispenser which can either be inserted by hand by the consumer or be adapted for installation into a container, can or bottle during a factory container filling operation using automatic machinery.

It is another object to provide a dispenser without any moving parts.

It is still a further object of the present invention to provide another embodiment of dispenser wherein there is only one moving part and this part is at all times maintained in a leakproof bath of the liquid to be dispensed. It is also a further object to provide a dispenser which allows the user to pick up and pour from the container to give a quick and consistent measured dose, with the flow of liquid being cut off as soon as the measured amount is delivered.

In the accompanying drawings, preferred embodiments of the present invention are shown and these embodiments are described in detail in the specification. However, it is to be understood that the drawings and description are not intended to be either exhaustive or limiting of the present invention in improved dispensers, but on the contrary, are for the purpose of illustrating and describing the invention in order that others skilled in the art may fully understand the invention, its principles and the application thereof and that they may embody it and adapt it in numerous forms, each as may be best suited to the requirements of a particular dispenser and its intended usage.

Figure 1:
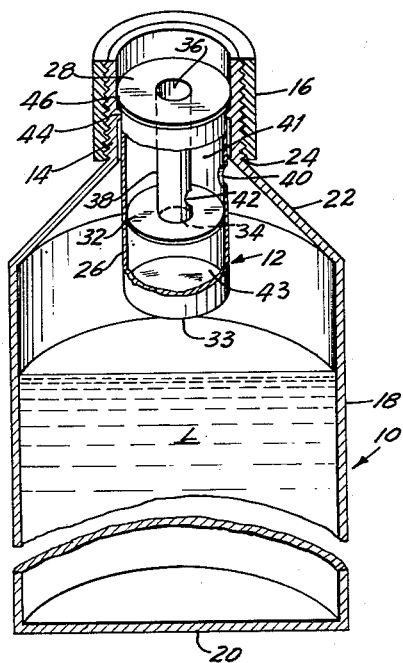
FIGURE 1 is a partially fragmentary perspective view of a dispenser for measuring liquids, the dispenser being inserted into a container.

Referring to the drawings and to FIGURE 1 in particular, a container 10 is shown which is fitted with a measured dosage dispenser 12. The container 10 may be of any suitable material and construction such as the well-known plastic, metal or glass containers for holding heavy viscous solutions such as liquid detergents. In the illustrated embodiment of FIGURE 1, the container 10 is shown as being made of metal, but this illustration is not intended to limit the scope of the present invention.

The container 10 has a neck portion 14 and the dispenser 12 is mounted in the container 10 by being fitted into the opening of neck 14.

A screw cap 16 is provided which closes off the neck portion. In place of the cap 16 any suitable closure means may be used.

The illustrated cylindrical container 10 includes a sidewall 18, a bottom wall 20 and an inclined upper wall 22. The inclined upper wall 22 joins the neck 14 at juncture 24.

In the embodiment shown in FIGURE 1, the dispenser 12 is cylindrical in shape and has a continuous sidewall 26, a top wall 28, an intermediate transverse partition 32 and a bottom wall 33. An opening 34 is provided in the transverse partition 32 and a second opening 36 is provided in the top wall 28. A conduit 38 connects the openings 34 and 36. An opening 40 is provided in the dispenser sidewall 26 and it is advantageously positioned so that it is near to but below the juncture 24 between the container neck 14 and the upper container wall 22. An opening 42 is also provided in the conduit 38 and this opening 42 is advantageously positioned beneath the sidewall opening 40.

Liquid "L" is first placed in the container 10 and then the dispenser 12 is inserted therein. If the dispenser is not forced fitted or otherwise secured within the neck 14 by other suitable means, e.g. adhesives, a shoulder 44 may be provided on the inner wall of the neck 14 and adapted to engage a flange 46 extending outwardly from the dispenser 12. In actual usage, it is preferred to have the dispenser securely set in place by suitable means to prevent its movement or disturbance when a measured dose is being obtained.

Figure 5:
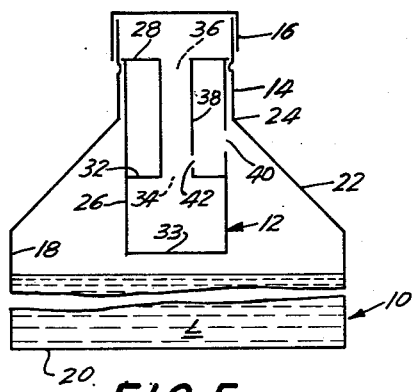
FIGURE 5 is a schematic view of the dispenser and container of FIGURE 1 before filling the dispenser with liquid.
Figure 6:
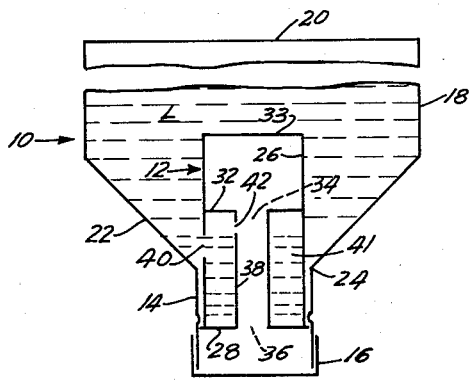
FIGURE 6 is a schematic view of the dispenser and container of FIGURE 5 inverted to fill the dispenser.

In order to obtain a measured dose, the container and dispenser are operated as shown in the schematic drawings of FIGURES 5 through 9. As shown in FIGURE 5, after the container 10 has been filled with liquid "L" and the dispenser 12 inserted into the container, the dispenser is empty. In order to fill the dispenser 12, the container 10 is inverted so that liquid "L" flows from the container through the sidewall dispenser opening 40 and into the upper dispenser compartment 41 formed by the top dispenser wall 28 and the transverse partition 32. Liquid flows into this upper dispenser compartment 41 until it has reached a level (in the inverted position of FIGURE 6) which closes off dispenser sidewall opening 40. When the liquid level reaches this point, the flow of air from the dispenser to the container is stopped. As a result, no further displacement of air takes place and no additional liquid "L" flows into the dispenser.

Figure 7:
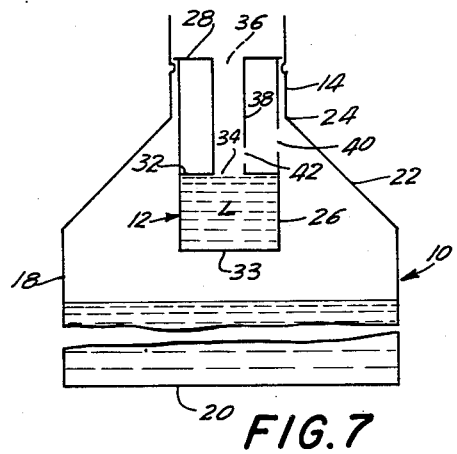
FIGURE 7 is a schematic view of the dispenser and container of FIGURE 1 returned to an upright position with the cap removed from the container and the dispenser filled with a measured quantity of liquid.

When the container 10 is returned to the upright position, as shown in FIGURE 7, the liquid "L" which was trapped in the upper dispenser compartment 41 flows through the conduit opening 42 and into the conduit and thence through the partition opening 34 into a lower dispenser compartment 43. The conduit opening 42 is preferably greater than the sidewall opening 40 so that the trapped liquid will flow into the lower dispenser compartment rather than back into the main portion of the container 10.

Figure 8:
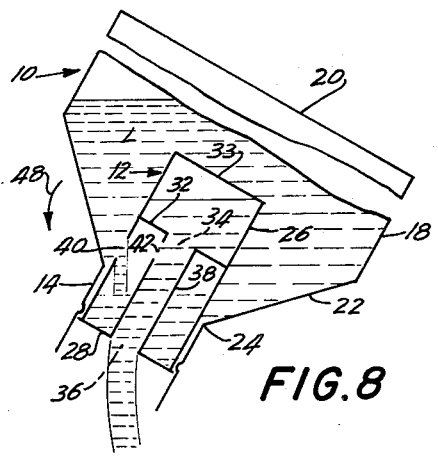
FIGURE 8 is a schematic view of the dispenser and container of FIGURE 1 inverted to dispense a measured dose.

With the lower dispenser compartment 43 filled, the cap 16 is removed from the container and a measured dose of liquid "L" may now be obtained. To pour out the measured dose the container 10 and dispenser 12 are inverted as shown in FIGURE 8. Upon inversion, the liquid "L" which was trapped in the lower dispenser compartment 43 flows through the opening 34, through the conduit 38 and out through the top opening 36. To insure that the flow does not pass out the conduit opening 42 it is preferable to invert the container (as positioned in FIGURE 8) in the direction of the arrow 48 which is shown in FIGURE 8.

Figure 9:
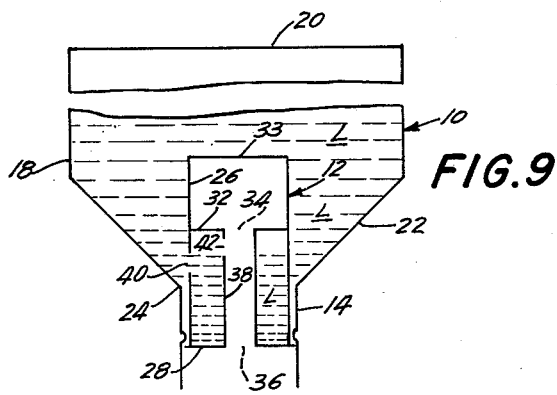
FIGURE 9 is a schematic view of the dispenser and container of FIGURE 1 still inverted with the measured dose dispensed and the flow of liquid cut off.

In actual operation an arrow may be placed on the container or the dispenser spout (see FIGURES 3 and 4) to indicate to the user that the container should be poured in the proper direction in order to obtain a measured dose. As the measured dose of liquid is dispensed from the lower dispenser compartment, additional liquid enters the upper dispenser compartment through the opening 40. About the time that the liquid level in the dispenser 12 has risen to close off the opening 40, the measured dose previously stored in the lower dispenser compartment 43 will have flowed out through the conduit 38. As described in relation to FIGURE 6 the rising of the liquid level to cover the opening 40 will cause the flow of further liquid into the dispenser to cease. As shown in FIGURE 9 when this liquid level is reached there is no further flow of liquid from the dispenser.

It is advantageous to maintain the openings 40 and 42 substantially on the same side of a plane which passes through the longitudinal axis of the dispenser. In this way it is assured that the liquid will flow into the dispenser and out of it in measured quantities.

Figure 2:
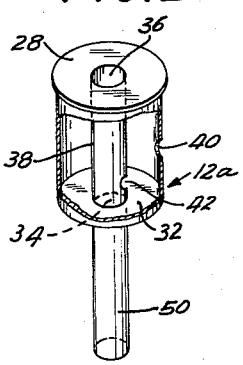
FIGURE 2 is a perspective view of another embodiment of a dispenser in accordance with the present invention.

It will be obvious to those skilled in the art that other embodiments other than those shown in FIGURE 1 can be utilized and yet within the scope of the present invention. In actual practice if it is desired the lower compartment of the dispenser may comprise a narrow and elongated extension of the conduit 38. Such a construction is shown in FIGURE 2. In FIGURE 2 the upper portion of the dispenser is similar to FIGURE 1 but the lower portion comprises a narrow and deeply extending reservoir 50.

Figure 3:
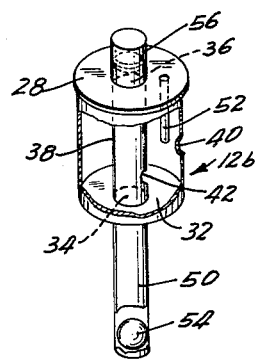
FIGURE 3 is a perspective view of still another embodiment of dispenser wherein a ball valve is incorporated therein.

In FIGURE 3 still another embodiment is shown which is similar to FIGURE 2. In this embodiment a vent or tube 52 is provided which assists in the filling of the dispenser. The tube 52 extends below the sidewall opening 40 and, therefore, will not permit liquid entering the inverted dispenser to overflow through tube 52 and discharge by this means, since the liquid level stops rising when opening 40 is covered, as previously described. In addition, in this embodiment, a ball valve 54 may also be provided. The ball valve 54 is normally located at the bottom of the reservoir 50 and when a measured dose is dispensed the ball valve falls behind the outpouring liquid acting as a piston. When all the trapped liquid has flowed from the reservoir, the ball valve 54 becomes seated on a valve seat 56, thus providing a positive, drip-free cutoff of liquid flowing from the dispenser reservoir. The use of such a ball valve or other seal is advantageous where it is desirable to have a fast, clean liquid cut-off with a minimum of dripping. However, it is satisfactory in most cases to use the dispenser without such a sealing mechanism.

Figure 4:
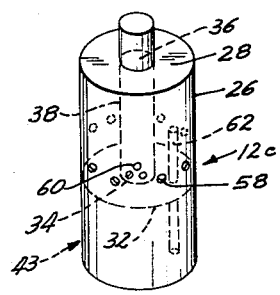
FIGURE 4 is a perspective view of another dispenser embodiment incorporating a vent tube and a plurality of liquid openings in the conduit and the dispenser sidewall.

In FIGURE 4 still another dispenser embodiment is shown wherein a series of openings 58 is provided in the dispenser sidewall 26. These openings are located in a position similar to opening 40 previously described except that they are circumferentially placed about the sidewall 26 at the same elevation. Further, a series of openings 60 may also be provided in the conduit 38 to replace the single conduit opening 42. These too are circumferentially placed and at the same elevation.

Such a plurality of openings is advantageously used in conjunction with a vent or tube 62 which extends through the partition 32 and downwardly through the bottom wall 33 of the lower dispenser compartment 43. The vent tube extends upwardly to the approximate elevation of the openings 58. The use of the vent 62 hastens the flow of liquid through the sidewall openings 58 and, further, permits them to be of reduced size.

From the foregoing it may be seen that the objects set forth hereinbefore and other advantages which are apparent and inherent in the foregoing disclosure are accomplished by the present invention in dispensers. To those skilled in the art other embodiments will be evident which cannot be made without being within the scope of the present invention as set forth in the subjoined claims.

I claim:

1. A dispensing device adapted to be used in combination with a container to dispense heavy viscous liquids from said container in predetermined amounts, said dispensing device comprising a casing having a top wall, sidewalls, and a bottom wall, a transverse partition extending across the casing and dividing said casing into upper and lower compartments, an opening in the top casing wall and an opening in the transverse partition, a longitudinally orientated conduit connecting said openings, an opening in the side of said conduit and an opening in the sidewall of said casing, the sidewall opening being above the conduit opening when the dispensing device is in an upright position, said container having a top opening with the dispensing device adapted to be positioned therein with said dispensing device sidewall opening being contained within said container and adjacent to said top opening in the container.

2. A dispensing device as defined in claim 1 wherein the opening in the conduit and the opening in the sidewall are positioned on the same side of a vertical plane passed through the longitudinal axis of the dispensing device.

3. A dispensing device as defined in claim 1 wherein a plurality of sidewall openings are provided.

4. A dispensing device as defined in claim 1 wherein a plurality of conduit openings are provided.

5. A dispensing device adapted to dispense heavy viscous liquids from a container in predetermined amounts as defined in claim 1 and further including a vent tube extending into the upper compartment to about the same elevation as the opening in the sidewall.

6. A dispensing device adapted to dispense heavy viscous liquids from a container in predetermined amounts as defined in claim 1 wherein the lower dispenser compartment is a downwardly directed extension of the conduit.

7. A dispensing device as defined in claim 6 and further including a ball valve movably located within said conduit and lower dispenser compartment adapted to shut off the flow of liquid when the dispenser is inverted.

References Cited in the file of this patent

UNITED STATES PATENTS

| | | |
|---|---|---|
| 936,334 | Marcuse | Oct. 12, 1909 |
| 2,387,374 | Watters | Oct. 23, 1945 |
| 2,977,028 | Joffe | Mar. 28, 1961 |

FOREIGN PATENTS

| | | |
|---|---|---|
| 142,210 | Australia | May 5, 1949 |
| 999,039 | France | Jan. 25, 1952 |
| 1,070,404 | France | July 26, 1954 |